(12) United States Patent
Lin et al.

(10) Patent No.: US 6,899,904 B2
(45) Date of Patent: May 31, 2005

(54) PET FOOD COMPOSITIONS HAVING ELECTROSTATICALLY CHARGED INGREDIENT

(75) Inventors: Charles Lin, Decatur, AL (US); Jay Dahlgren, Madison, AL (US); Scott Morris, Chatham, NJ (US)

(73) Assignee: The Meow Mix Company, Secaucus, NJ (US)

( * ) Notice: Subject to any disclaimer, the term of this patent is extended or adjusted under 35 U.S.C. 154(b) by 0 days.

(21) Appl. No.: 10/607,465

(22) Filed: Jun. 26, 2003

(65) Prior Publication Data

US 2004/0096481 A1 May 20, 2004

Related U.S. Application Data (63) Continuation-in-part of application No. 10/294,374, filed on Nov. 14, 2002, now Pat. No. 6,841,179.

(51) Int. Cl.[7] .................................. A23K 1/00
(52) U.S. Cl. ........................... 426/2; 426/53; 426/601; 426/656; 426/658; 426/805; 426/807
(58) Field of Search .............................. 426/2, 53, 656, 426/658, 805, 807

(56) References Cited

U.S. PATENT DOCUMENTS

| | | | | |
|---|---|---|---|---|
| 3,862,336 A | | 1/1975 | Kofsky et al. ................. 426/1 |
| 4,267,195 A | * | 5/1981 | Boudreau et al. .............. 426/2 |
| 4,282,254 A | * | 8/1981 | Franzen et al. ................ 426/2 |
| 4,393,085 A | * | 7/1983 | Spradlin et al. .............. 426/28 |
| 4,418,086 A | * | 11/1983 | Marino et al. .............. 426/302 |
| 4,713,250 A | * | 12/1987 | Tonyes et al. ................. 426/2 |
| 4,804,549 A | * | 2/1989 | Howley et al. ............... 426/98 |
| 5,595,761 A | | 1/1997 | Allen, Jr. et al. ........... 424/484 |
| 5,709,894 A | * | 1/1998 | Julien .......................... 426/53 |
| 5,928,686 A | * | 7/1999 | Ivey et al. ..................... 426/2 |
| 6,080,403 A | | 6/2000 | Shields, Jr. et al. ...... 424/94.65 |
| 6,221,380 B1 | | 4/2001 | Woodroofe et al. ......... 424/438 |
| 6,383,529 B2 | | 5/2002 | Davenport et al. ......... 424/773 |
| 6,455,083 B1 | | 9/2002 | Wang ......................... 426/104 |

FOREIGN PATENT DOCUMENTS

| | | | |
|---|---|---|---|
| GB | 955642 | * | 4/1964 |
| JP | 356048860 A | | 5/1981 |
| WO | 97/13415 | * | 4/1997 |
| WO | 00/00189 | * | 1/2000 |

\* cited by examiner

*Primary Examiner*—C. Sayala
(74) *Attorney, Agent, or Firm*—Hovey Williams LLP

(57) ABSTRACT

Animal feed compositions comprising amounts of protein, carbohydrate, fat and a functional ingredient for preventing hairball formation are provided. The functional ingredient comprises an electrostatically charge ingredient, preferably selected from the group consisting of electrostatically charged proteins, amino acids, conjugated proteins, dipeptides, multipeptides, protein colloids, enzymes, protein hydrolysates, natural and artificial food additives, flavorings, seasonings, and mixtures thereof.

33 Claims, 5 Drawing Sheets

PET FOOD COMPOSITIONS HAVING ELECTROSTATICALLY CHARGED INGREDIENT

RELATED APPLICATION

This is a continuation-in-part of U.S. patent application Ser. No. 10/294,374, filed Nov. 14, 2002, now U.S. Pat. No. 6,841,179, which is incorporated by reference herein.

BACKGROUND OF THE INVENTION

1. Field of the Invention

The present invention pertains to animal feed compositions which prevent hairball formation and function to reduce the odor of the animal's excrement. Generally the compositions comprise respective amounts of protein, carbohydrate and fat, and are intended to constitute the primary diet for the animal. The compositions also comprise one or more ingredients which bear an electrostatic charge.

2. Description of the Prior Art

Hairball formation is a common physiological problem affecting animals which spend significant amounts of time grooming themselves, consequently ingesting their own hair. Cats are especially susceptible to hairball formation given that self-grooming occupies nearly one-third of their waking hours. Hair which is ingested and does not immediately pass through the cat's digestive track may accumulate in the stomach. After eating a meal and drinking a small portion of water, it is common for the cat to lay down and sleep. These factors taken together create ideal conditions for hairball formation. The hair, food particles, mineral salts, and the cat's own digestive mucus entangle to form a hairball. Hairball formation often leads to vomiting and diarrhea in the animal.

A number of pet food products are available which are directed toward alleviating this problem in animals, especially cats. Fiber-based products utilize cellulose, particularly from wood fiber or beet pulp, as functional ingredients to assist in removal of accumulated hair in the animal's stomach. Oil-based products use mineral oils as lubricating agents for removal of hair from inside the animal's stomach. However, cellulose and mineral oil are not natural components in the diet of cats and can decrease the product's palatability. In order to increase the palatability of these products, flavor enhancers are often added to the products thereby increasing the food's production cost. Fiber and oil-based products also disadvantageously increase the passage of food materials through the animal's digestive tract thereby reducing nutrient digestion and absorption.

U.S. Pat. No. 6,080,403 discloses another proposed method of preventing animal hairball formation. The '403 patent describes a pet food product including the enzyme bromelain, commonly found in pineapple juice. However, bromelain is not suitable for use in moist or canned pet food products due to its instability at temperatures which exceed 170° C.

Therefore, there is a real and unfulfilled need in the art for a pet food composition for preventing hairball formation which comprises a functional ingredient which is a natural part of the animal's diet and which does not detract from the food's nutritional value by interfering with the absorption and digestion of the food product. Furthermore, the functional ingredient should be capable of use in all types of animal feeds regardless of feed moisture content.

SUMMARY OF THE INVENTION

The present invention overcomes the above problems and provides animal feed compositions which inhibit hairball formation. A preferred composition according to the invention comprises protein, carbohydrate, fat and an ingredient bearing an electrostatic charge. Preferably the composition will comprise from about 0.01–64.0% by weight of the electrostatically charged ingredient, more preferably from about 0.25–10.0% by weight, and most preferably from about 0.5–1.0% by weight. All weight percentages expressed herein are based on the weight of the entire composition unless otherwise specified.

The electrostatically charged ingredient may be any composition which is capable of bearing an electrostatic charge (either positive or negative) and is suitable for animal ingestion. Preferably, the electrostatically charged ingredient comprises a member selected from the group consisting of electrostatically charged proteins, amino acids, conjugated proteins, dipeptides, multipeptides, protein colloids, enzymes, protein hydrolysates, natural and artificial food additives, flavorings, seasonings, and mixtures thereof.

Various amino acids which comprise proteins can be made to lose electrons or protons depending on specific processing steps that they may undergo. For example, if the pH of an aqueous dispersion of protein molecules is adjusted to the basic range, the carboxyl group of one or more amino acids can lose a proton thereby imparting an overall negative charge to the protein molecule. If the pH of a similar aqueous dispersion of protein molecules is adjusted to the acidic range, the amino group of one or more amino acids can lose an electron thereby imparting an overall positive charge to the protein molecule. Gelatin is a preferred protein for use with the present invention.

Gelatin is a transparent, brittle, essentially odorless and tasteless powder. Gelatin is a composition which is comprised of a plurality of different amino acids and is typically extracted from by-products of the meat industry including pork skin, tendons, ligaments, and bones. The imposition of an electrostatic charge on to the gelatin involves either the addition or removal of electrons from various groups on at least one of the amino acids of which gelatin is comprised. If the gelatin is to have a negative electrostatic charge, a proton is removed from the carboxyl group of an amino acid while the amino group remains neutral. If the gelatin is to have a positive electrostatic charge, an electron is removed from the amino group of the amino acid while the carboxyl group remains neutral. Preferably, the gelatin will have a negative electrostatic charge. The electrostatically charged gelatin is preferably formed according to a method described in U.S. patent application Ser. No. 10/294,274, filed Nov. 14, 2002, which is incorporated by reference herein.

In addition to the use of proteins, various individual amino acids may be employed as an electrostatically charged ingredient for use in inventive pet food compositions. Preferred amino acids include electrostatically charged members selected from the group consisting of glycine, alanine, valine, phenylalanine, leucine, threonine, isolucine, methionine, tyrosine, serine, cystine, cysteine, and mixtures thereof. The electrostatic charge may be imparted to amino acids in similar fashion to proteins, through pH adjustment of an aqueous dispersion containing the amino acid.

Some amino acids naturally bear an electrostatic charge, and therefore, do not require any pH adjustment processing. Preferred amino acids which naturally bear a negative charge include aspartic acid, glutamic acid and proline. Preferred amino acids which naturally bear a positive charge include lysine, arginine, histidine, and hydroxy-proline. When these natural charge-bearing amino acids are used as the electrostatically charged ingredient, they preferably comprise between about 0.01–20.0% by weight of the pet food composition, more preferably from about 0.25–5.0% by weight, and most preferably from about 0.5–1.5% by weight. Several individual natural charge bearing amino acids have particularly preferred ranges. These include arginine, from about 0.01–1.0% by weight; histidine, from about 0.01–0.25% by weight; and lysine, from about 0.01–0.75% by weight. Generally, the charge of these natural charge-bearing amino acids is relatively weak when compared with the electrostatically charged amino acids which have undergone pH adjustment processing. It may be possible to enhance or strengthen the electrostatic charge of these natural charge-bearing amino acids by subjecting them to the pH adjustment processing described above and in U.S. patent application Ser. No. 10/294,274.

Conjugated proteins such as those contained in egg yolk, egg white, soybean protein, yeast and milk can undergo pH adjustment in order to impart positive or negative electrostatic charges. Examples of such conjugated proteins include liproproteins (e.g., phospholipids obtained from egg yolk), glygoproteins (e.g., ovomucoid obtained from egg white and hemagglutinin and 7S, 11S globulin obtained from soybean protein), metalloproteins (e.g., hemoglobin, myoglobin, ferritin, and conalbumin), nucleoproteins (e.g., nucleic acids obtained from yeast), and phospoproteins (e.g. casein obtained from milk and pepsin obtained from soybeans). It is also within the scope of the present invention to use electrostatically charged di- or multipeptides in pet food formulations. Such di- and multipeptides can lose or gain protons in order to obtain an electrostatic charge. Exemplary di- and multipeptides include anserine and carnosine.

Various protein colloids may also be prepared which bear an overall electrostatic charge. Such colloids are prepared as aqueous dispersions and include, for example, synthetic latex/protein colloids, silica particles/protein colloids, and charged dipolar colloid particles.

Enzymes may also undergo pH adjustment processing in order to impart an electrostatic charge. Exemplary charged enzymes include ribonuclease A (preferably positively charged), glutamate dehydrogenase (positively or negatively charged), and reduced glutathionine (preferably negatively charged).

Protein hydrolysates are obtained by hydrolyzing certain animal proteins using protease enzymes under optimal temperature conditions. These protein hydrolysates can be stabilized by the addition of phosphoric acid to lower the pH (to about 2.2–3.5) before being added to dry animal feed. At a low pH, these protein hydrolysates bear positive charges. There are five types of animal protein hydrolysates: meat hydrolysates, collagen hydrolysates, gelatin hydrolysates, elastin hydrolysates, and egg hydrolysates. It is important to note that if the pH of these hydrolsates is adjusted into the basic range (beyond each respective isoelectric point), the carboxyl group of each amino acid comprising the protein hydrolysate can take on a negative charge.

The use of various naturally occurring positively or negatively charged food additives, flavorings and seasonings is also within the scope of the present invention. One example of such food ingredients is leavening agents which are acid or alkaline and can be added to foods to obtain a desired taste. Also, proteins having negative or positive charges may be used as carriers for flavorings and seasonings.

Animal feed compositions according to the present invention may be in the form of dry, semi-dry or moist animal feeds. Preferred dry feeds are characterized by a moisture content of less than about 12% by weight, more preferably about 5–10% by weight, and most preferably about 6.5–8.5% by weight. Semi-dry feeds preferably comprise from about 12–35% by weight moisture and more preferably from about 20–25% by weight. Semi-dry products can be manufactured with slightly raised moisture contents and packed in pouches. These elevated-moisture products preferably have a moisture content of about 35.0–75% by weight, more preferably from about 40.0–70.0% by weight, and most preferably about 45.0–55.0% by weight. Moist or canned feeds preferably have a moisture content of at least 75% by weight and more preferably from about 70–75% by weight. Dry and semi-dry feeds and are preferably formed into self-sustaining extruded bodies presenting outer surfaces by extrusion processing. In preferred embodiments, the composition will comprise a coating which is applied to the outer surface of the body. Preferably, the coating will comprise a quantity of an electrostatically charged ingredient, more preferably from about 0.001–50.0% by weight of the electrostatically charged ingredient, and most preferably from about 0.25–1.5% by weight, based on the weight of the entire coated composition.

Preferred compositions also comprise at least one additional component selected from the group consisting of animal bile acid, fungal acid protease, papain, and mixtures thereof. Fungal acid protease and papain are useful compounds in breaking up the mucus component of hairballs, while animal bile acid is useful in dissolving mineral salts which may also be present in hairballs. The additional component or components are preferably applied as part of the coating and in an amount of from about 0.001–15.0% by weight and preferably from about 0.5–5.0% by weight, based on the weight of the entire composition. However, it is possible for these components to be internally incorporated within the food product, especially in moist feed applications.

Compositions according to the present invention comprise from about 15.0–55.0% by weight crude protein, more preferably from about 25.0–45.0% by weight, and most preferably from about 30.0–35.0% by weight. Preferred dry animal feeds comprise from about 25.0–45.0% protein, and preferred semi-dry feeds comprise from about 19–25% by weight protein. Both plant and animal protein sources may be used to supply the required amount of protein. Exemplary animal protein sources include casein, albumin, whey, egg, fresh meat tissue, fresh fish tissue, dried or rendered meals such as fish meal, poultry meal, and bone meal. Exemplary plant protein sources include soybeans, cotton seeds, peanuts, corn gluten meal and wheat gluten meal. Microbial proteins such as yeast, fungus and bacteria are also useful protein sources. This crude protein is not to be confused with the electrostatically charged protein which may be used as the electrostatically charged ingredient in the animal feed formulation. While the electrostatically charged protein may be derived from the same or similar source as the crude protein, the electrostatically charged protein undergoes some degree of refinement and/or processing in order to impart the electrostatic charge.

Compositions according to the present invention also comprise from about 20–70% by weight carbohydrate, more preferably from about 25.0–55.0% by weight, and most preferably from about 30.0–45.0% by weight. Preferred dry animal feeds comprise from about 35.0–40.0% carbohydrate, and preferred semi-dry feeds comprise from about 20.0–45.0% by weight carbohydrate. The carbohydrate is preferably provided by a farinaceous material having a protein content of less than about 15% by weight. Grains such as corn, milo, alfalfa, wheat, barley, and rice and potatoes are preferred sources of carbohydrate, as well as corn syrup, sugar, and molasses.

Compositions according to the present invention further comprise from about 1–30% by weight fat, more preferably from about 5.0–25.0% by weight, and most preferably from about 10.0–20.0% by weight. Preferred dry animal feed compositions comprise from about 10.0–15.0% by weight fat, and preferred semi-dry feeds comprise from about 5.0–10.0% by weight fat. The fat may be supplied from either plant or animal sources, and preferably, combinations of both. Exemplary animal fat sources are the fat tissues of cattle, pigs, lambs, goats, turkeys, chicken, geese, ducks and fish. Exemplary plant fat sources include soybean oil, cottonseed oil, and olive oil.

Animal feed compositions according to the invention optionally comprise quantities of ash and fiber. Preferably, the feeds comprise from about 2.0–13.0% by weight ash, and more preferably from about 6.0–8.0% by weight. Preferably, the feeds comprise from about 1.0–13.0% by weight fiber, and more preferably from about 2.0–10.0% by weight. Preferred fiber sources include cellulose, semi-cellulose, corn cobs, soy hulls, peanut hulls, rice hulls, and yeast cell walls.

Preferred compositions according to the invention comprise at least one vitamin or mineral selected from the group consisting of calcium carbonate, potassium chloride, sodium chloride, taurine, zinc oxide, ferrous sulfate, vitamin E, vitamin A, vitamin B12, vitamin D3, vitamin K, riboflavin, niacin, calcium pantothenate, biotin, thiamine mononitrate, copper sulfate, folic acid, pyroxidine hydrochloride and calcium iodate. The vitamins and minerals are added in amounts according to American Association of Feed Control Officials (AAFCO) Cat Food Nutrient profiles.

It is within the scope of the present invention to provide methods for preventing hairball formation in an animal. Generally, methods according to the invention comprise the steps of providing a composition in accordance with the invention as described above and feeding the composition to an animal, preferably a cat. In a preferred embodiment, the method comprises providing a composition including protein, carbohydrate, fat and an electrostatically charged ingredient. In another preferred embodiment, the method comprises providing a composition including protein, carbohydrate, fat, and at least one additional component selected from the group consisting of animal bile acid, fungal acid protease, papain, and mixtures thereof.

DETAILED DESCRIPTION OF THE PREFERRED EMBODIMENT

Pet food compositions according to the present invention generally comprise amounts of protein, carbohydrate, fat, and a hairball preventative ingredient. The hairball preventative ingredient is preferably selected from the group consisting of electrostatically charged gelatin, fungal acid protease, papain, animal bile acid, and mixtures thereof. The pet food compositions can have varying moisture contents. Exemplary dry, semi-dry, and moist compositions are set forth in Table 1.

TABLE 1

| Ingredient | Dry feeds Amount (wt. %) | Semi-dry feeds Amount (wt. %) | Moist feeds Amount (wt. %) |
| --- | --- | --- | --- |
| Brewer rice | 20.0–30.0 | 25.0–45.0 | 15.0–20.0 |
| Poultry meal | 25.0–35.0 | 20.0–25.0 | 5.0–10.0 |
| Corn gluten meal | 10.0–25.0 | 15.0–20.0 | 1.0–5.0 |
| Yellow corn | 10.0–15.0 | 10.0–15.0 | 5.0–10.0 |
| Fish meal | 1.0–6.0 | 1.0–3.5 | 2.0–5.0 |
| Soybean meal | 5.0–15.0 | 1.0–5.0 | 1.0–5.0 |
| Fresh fish tissue | 5.0–15.0 | 5.0–20.0 | 15.0–25.0 |
| Fresh poultry tissue | 15.0–25.0 | 5.0–15.0 | 10.0–15.0 |
| Cellulose | 4.0–12.0 | 5.0–10.0 | 5.0–10.0 |
| High fructose corn syrup | 1.0–5.0 | 15.0–20.0 | — |
| Dry molasses | 1.0–5.0 | 0.5–1.5 | — |
| Phosphoric acid | 1.0–2.0 | 1.0–1.5 | — |
| Citric acid | 0.5–2.0 | 0.1–0.15 | — |
| Mineral premix | 0.5–2.0 | 0.5–2.0 | 0.2–0.7 |
| Vitamin mix | 0.5–2.0 | 0.25–0.5 | 0.2–0.5 |
| Gelatin, (−) charged | 0.1–10.0 | 5.0–10.0 | 5.0–45.0 |
| Glycerine | — | 10.0–15.0 | — |
| Potassium sorbate | — | 0.2–0.3 | — |
| Animal bile acid | 0.001–0.002 | 0.001–0.002 | — |
| Water (added) | — | — | 45.0–55.0 |
| Animal fat | 6.0–10.0 | 6.0–10.0 | — |

Table 2 is intended to summarize additional preferred compositions which are within the scope of the invention. The amounts of each ingredient are given in terms of both broad and preferred ranges. The gelatin for use in the exemplary compositions of Table 2 may comprise gelatin having either a positive or negative electrostatic charge.

TABLE 2

| Ingredient | Broad Range (wt. %) | Preferred Range (wt. %) |
| --- | --- | --- |
| Poultry meal | 15.00–30.00 | 23.00–24.00 |
| Brewers rice | 10.00–30.00 | 19.00–20.00 |
| Corn gluten meal | 10.00–25.00 | 17.00–18.00 |
| Yellow corn | 10.00–20.00 | 12.00–13.00 |
| Cellulose | 1.00–15.00 | 5.00–10.00 |
| Gelatin (+) or (−) | 0.1–10.00 | 0.5–5.00 |
| Edible tallow | 1.00–15.00 | 5.00–6.00 |
| Fish meal | 1.00–6.00 | 3.00–5.00 |
| Chicken liver powder | 1.00–5.00 | 2.00–2.50 |
| Soybean oil | 1.00–5.00 | 1.50–2.00 |
| Mineral premix | 0.10–0.65 | 0.20–0.35 |
| Choline chloride (dry) | 0.20–0.40 | 0.30–0.40 |
| Brewers yeast | 0.10–1.50 | 0.20–0.25 |
| Salt | 0.10–0.55 | 0.10–0.15 |
| Taurine | 0.01–0.15 | 0.05–0.08 |
| Vitamin premix | 0.05–0.15 | 0.05–0.07 |

EXAMPLES

The following examples describe preferred compositions produced in accordance with the present invention. It is to be understood that these examples are provided by way of illustration and nothing therein should be taken as a limitation on the overall scope of the invention.

Example 1

This example describes a preferred dry cat food composition for preventing hairball formation produced in accordance with the invention. The composition is formulated mixing together the following ingredients:

TABLE 2

| Ingredient | Amount (wt. %) |
|---|---|
| Brewer rice | 26.00 |
| Poultry meal | 25.00 |
| Corn gluten meal | 17.50 |
| Yellow corn | 10.85 |
| Cellulose | 8.00 |
| Animal fat | 6.45 |
| Fish meal | 3.05 |
| Poultry digest | 2.50 |
| Soybean oil | 1.65 |
| Soybean meal | 1.05 |
| Phosphoric acid | 1.00 |
| Mineral premix | 0.25 |
| Vitamin mix | 0.20 |
| Gelatin, (−) charged | 0.50 |

The mixture is then passed through a twin-screw extrusion apparatus and the extrudate cut into portions of appropriate size for consumption by a cat. The maximum temperature of the composition at any given point in the extruder is 230° F. thereby avoiding excessive expansion of the extrudate. The maximum pressure at any given point within the extruder is 250 psi. The cut extrudate is dried to a moisture content of 8.5% by weight. A coating comprising 1% by weight negatively charged gelatin, 0.2% by weight fungal acid protease, 0.15% by weight papain, and 0.001 % by weight animal bile acid (all weight percentages based on the weight of the entire coated composition) is sprayed on to the dried extrudate. As used herein the term "vitamin mix" refers to a mixture of assorted vitamins and minerals set forth in the American Association of Feed Control Officials (AAFCO) Cat Food Nutrient profiles.

Example 2

This example describes a preferred semi-dry cat food composition for preventing hairball formation produced in accordance with the invention. The composition is formulated mixing together the following ingredients:

TABLE 3

| Ingredient | Amount (wt. %) |
|---|---|
| Brewer rice | 21.00 |
| Poultry meal | 20.00 |
| High fructose corn syrup | 15.00 |
| Corn gluten meal | 10.00 |
| Glycerine | 10.00 |
| Yellow corn | 8.25 |
| Cellulose | 5.00 |
| Animal fat | 2.80 |
| Soybean oil | 1.65 |
| Dry molasses | 1.50 |
| Phosphoric acid | 1.50 |
| Fish meal | 1.00 |
| Soybean meal | 1.00 |
| Gelatin, (−) charged | 0.50 |
| Mineral premix | 0.25 |
| Vitamin mix | 0.25 |
| Potassium sorbate | 0.20 |
| Citric acid | 0.10 |

The mixture is then passed through a twin-screw extrusion apparatus and the extrudate cut into portions of appropriate size for consumption by a cat. The maximum temperature of the composition at any given point in the extruder is 245° F. The maximum pressure at any given point in the extruder is 250 psi. The cut extrudate is dried to a moisture content of 25% by weight. A coating comprising 1% by weight negatively charged gelatin, 0.25% by weight fungal acid protease, 0.15% by weight papain, and 0.002% by weight animal bile acid (all weight percentages based on the weight of the entire coated composition) is sprayed on to the dried extrudate.

Example 3

This example describes a preferred moist cat food composition for preventing hairball formation produced in accordance with the invention. The composition is formulated mixing together the following ingredients:

TABLE 4

| Ingredient | Amount (wt. %) |
|---|---|
| Water | 45.00 |
| Yellow corn | 15.00 |
| Fresh fish tissue | 15.00 |
| Fresh poultry tissue | 10.00 |
| Poultry meal | 5.00 |
| Cellulose | 5.00 |
| Fish meal | 2.00 |
| Soybean meal | 1.00 |
| Corn gluten meal | 1.00 |
| Gelatin, (−) charged | 0.50 |
| Mineral premix | 0.30 |
| Vitamin mix | 0.20 |

The fresh tissues are frozen and ground through a ⅛ in. die plate and mixed with water at 70° F. The remaining dry ingredients are mixed in and the resulting slurry is precooked to a maximum temperature of 145° F. before canning. The mixture is placed in cans which are then retorted at 250–260° F. for about 50–52 minutes using 15 psi steam.

Examples 4

In this example, various negatively charged amino acid solutions were prepared for testing on cat hair to determine how the solution affected the integrity of the hair. First, a 1.0% amino acid solution was prepared by mixing 5.0 g amino acid with 495 g of water. The resulting pH value of each amino acid solution at this point differed, based largely upon the different pK values for each amino acid. A sufficient quantity of sodium hydroxide solution (50.0%) was added to the 1.0% amino acid solution to adjust the pH to 11.3. Weaker amino acid solutions (0.5%, 0.25%, and 0.125%) were subsequently prepared by dilution of the 1.0% solution.

Approximately 0.40 g of cat hair were mixed with 100 g samples of each respective amino acid solution. The cat hair and amino acid solution were kept at 100° F. for 24 hours. Photographs of the cat hairs were taken with a Topcon Technology Company Model ISI-X408 electrical scan microscope at 810× magnification and the degree of hair damage and loss of identifying characteristics was noted.

TABLE 5

| Amino acid | 0.125% solution | 0.25% solution | 0.5% solution | 1.0% solution |
|---|---|---|---|---|
| Alanine | Cuticle removed | Cortex damaged | Cortex damaged | Cortex damaged |
| Aspartic acid | Cuticle removed | Cortex damaged | Cortex damaged | Cortex damaged |
| Cysteine | No damage | Cuticle | Cortex | Cortex |

TABLE 5-continued

| Amino acid | 0.125% solution | 0.25% solution | 0.5% solution | 1.0% solution |
|---|---|---|---|---|
| Glutamic acid | Cuticle removed | Cortex damaged | removed Cortex damaged | damaged Cortex damaged |
| Glycine | Cuticle removed | Cortex damaged | Cortex damaged | Cortex damaged |
| Lysine | No damage | No damage | Cuticle removed | Cortex damaged |
| DL-methionine | No damage | Cuticle removed | Cortex damaged | Cortex damaged |
| Proline | Cuticle removed | Cortex damaged | Cortex damaged | Cortex damaged |

Figure 1:
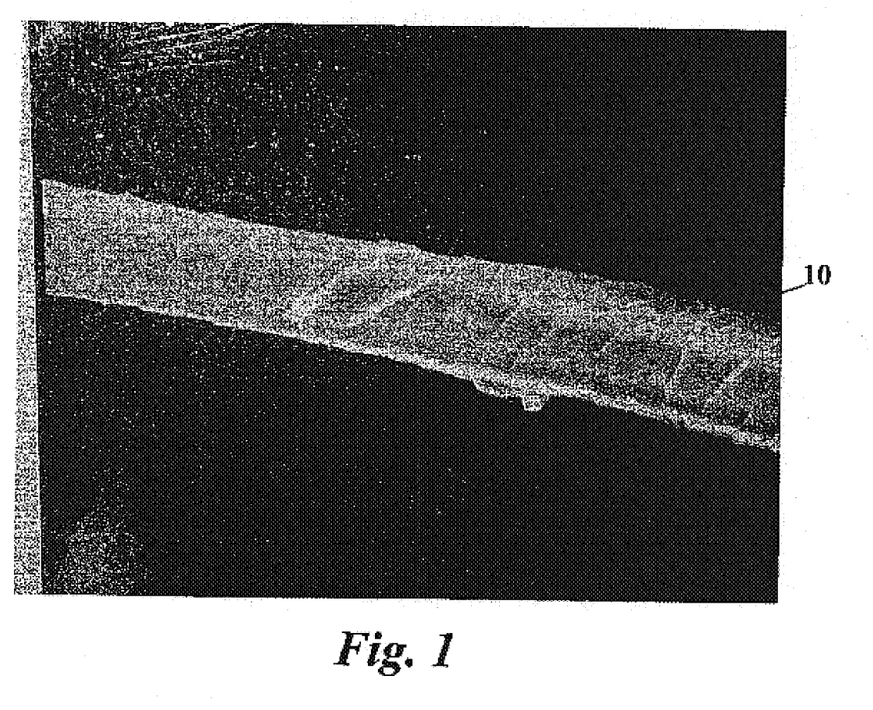
FIG. 1 is a photograph of an untreated cat hair cat taken under microscope.

Turning now to the figures, FIG. 1 is a photograph of an untreated cat hair under magnification. The cuticle layer 10 of the hair is clearly visible and surrounds substantially the entirety of the hair. In order to attack and weaken the inner structure of the hair so as to destroy its ability to form hairballs, at least portions of the cuticle layer 10 must first be removed.

Figure 2:
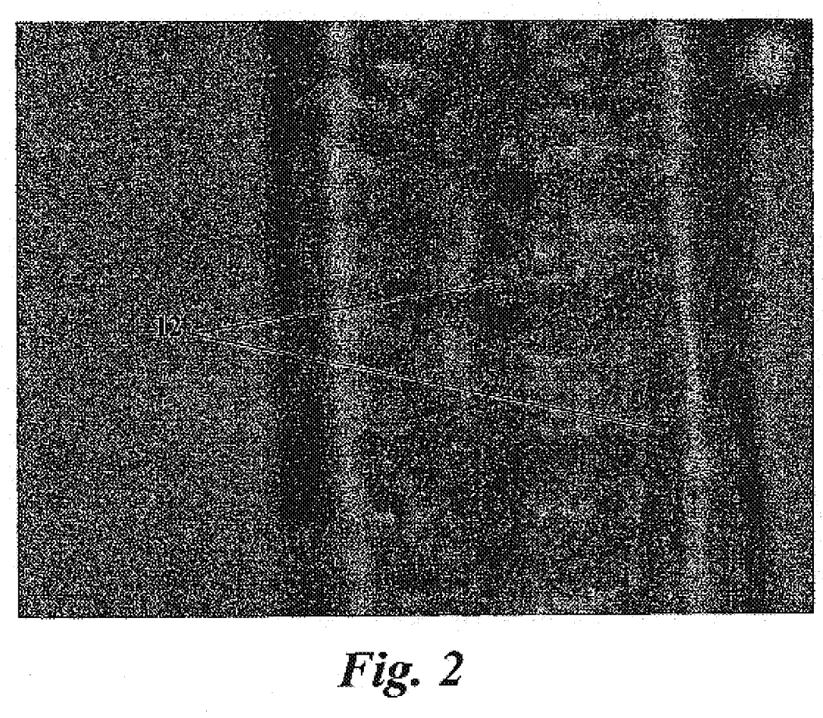
FIG. 2 is a photograph of a cat hair treated with a 0.125% glycine solution.

As an exemplary illustration of the present invention, FIGS. 2–5 show cat hair which has been treated with varying concentrations of a charged glycine solution. FIG. 2 depicts a cat hair which was treated with a 0.125% charged glycine solution. The portions of the cuticle layer have been removed thereby exposing the inner cortex layer 12.

Figure 3:
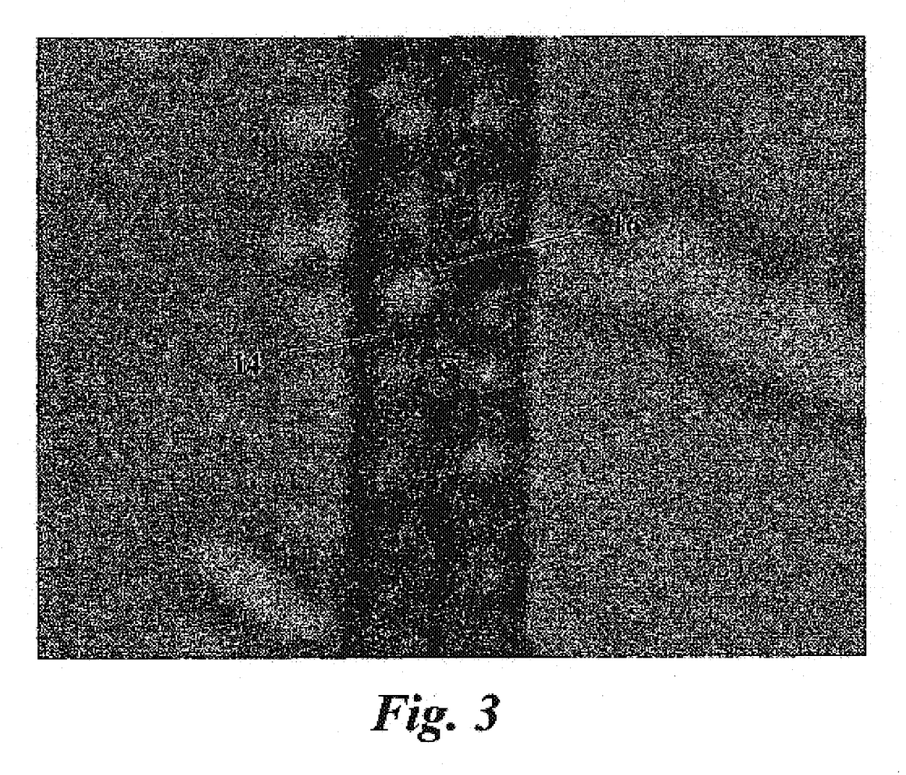
FIG. 3 is a photograph of a cat hair treated with a 0.25% glycine solution.

FIG. 3 shows a cat hair treated with a 0.25% charged glycine solution. The cuticle 14 has separated thereby forming a channel and exposing the hair cortex 16.

Figure 4:
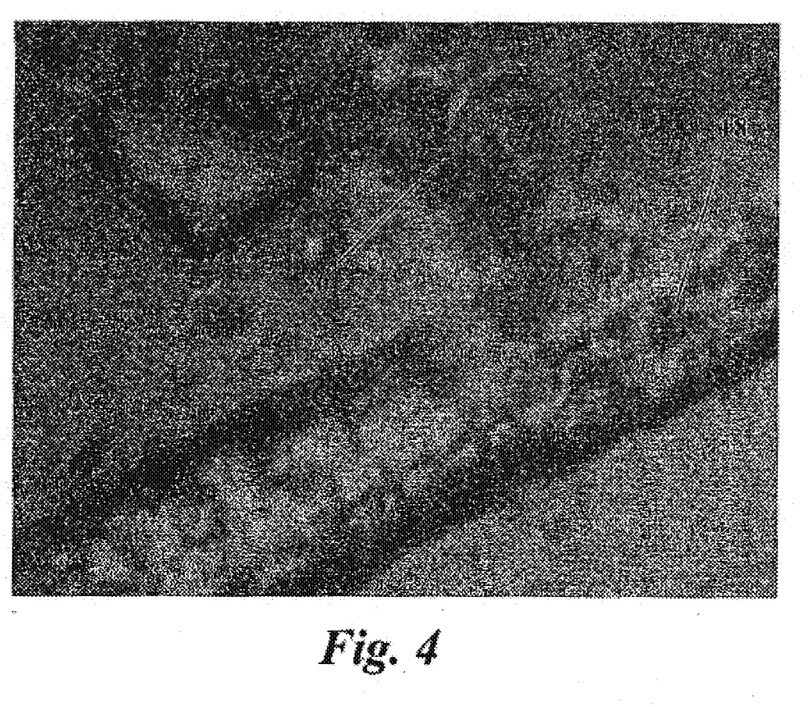
FIG. 4 is a photograph of a cat hair treated with a 0.5% glycine solution.

FIG. 4 is a photograph of a cat hair treated with a 0.5% charged glycine solution.

Portions of the hair cortex 18 have been completely dissolved and the cuticle 20 has been displaced.

Figure 5:
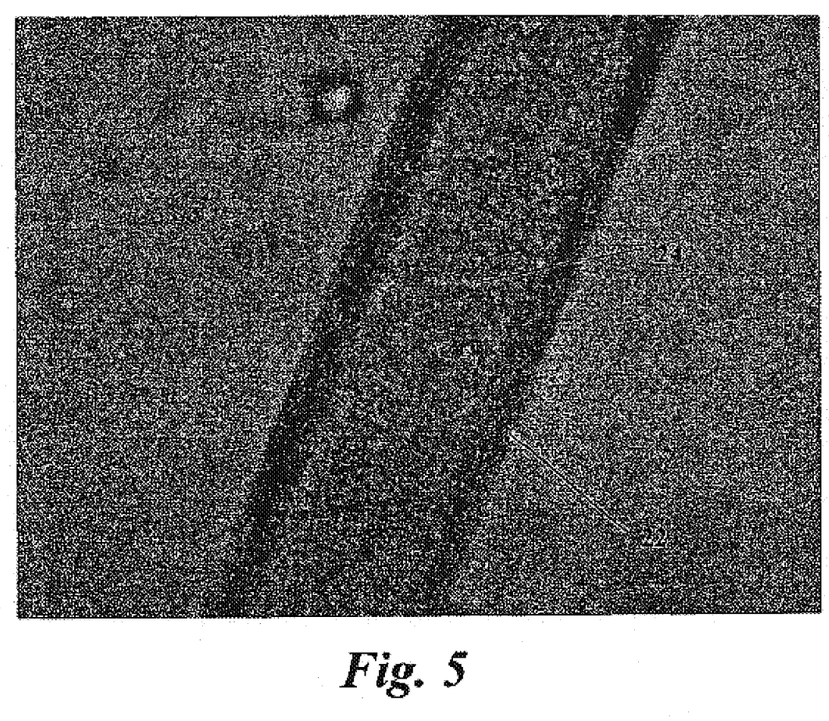
FIG. 5 is a photograph of a cat hair treated with a 1.0% glycine solution.

FIG. 5 is a photograph of a cat hair treated with a 1.0% charged glycine solution. Line 22 shows that the cuticle has been removed thereby exposing the hair cortex 24.

The figures show that the charged glycine solution attacks the outer cuticle layer of the hair and then works to weaken or destroy the inner cortex layer. In so doing, the characteristics and functionality of the hair is altered so that the hair is no longer capable of forming a hairball.

We claim:

1. An animal feed composition comprising an electrostatically charged ingredient selected from the group consisting of electrostatically charged glycine, alanine, serine, and combinations thereof.

2. The composition of claim 1, said composition comprising between about 0.01–64.0% by weight of said electrostatically charged ingredient.

3. The composition of claim 1, said composition comprising a coating, wherein said coating comprises from about 0.001–50.0% by weight of said electrostatically charged ingredient based on the weight of the entire coated composition.

4. The composition of claim 1, said composition further comprising at least one ingredient selected from the group consisting of carbohydrates, proteins, and fats.

5. The composition of claim 1, said electrostatically charged ingredient bearing a negative charge.

6. An animal feed composition comprising an electrostatically charged ingredient selected from the group consisting of electrostatically charged glycine, alanine, serine, glutamic acid, aspartic acid, lysine, proline and combinations thereof, the electrostatic charge on said ingredient being greater than the charge exhibited by the ingredient in its natural state.

7. The composition of claim 6, said composition comprising between about 0.01–64.0% by weight of said electrostatically charged ingredient.

8. The composition of claim 6, said composition comprising a coating, wherein said coating comprises from about 0.001–50.0% by weight of said electrostatically charged ingredient based on the weight of the entire coated composition.

9. The composition of claim 6, said composition further comprising at least one ingredient selected from the group consisting of carbohydrates, proteins, and fats.

10. The composition of claim 6, said electrostatically charged ingredient bearing a negative charge.

11. An animal feed composition comprising an electrostatically charged ingredient selected from the group consisting of electrostatically charged glycine, alanine, serine, glutamic acid, aspartic acid, lysine, proline and combinations thereof, the pH of said ingredient being below about 5 or above about 9 prior to being incorporated into said composition.

12. The composition of claim 11, said composition comprising between about 0.01–64.0% by weight of said electrostatically charged ingredient.

13. The composition of claim 11, said composition comprising a coating, wherein said coating comprises from about 0.001–50.0% by weight of said electrostatically charged ingredient based on the weight of the entire coated composition.

14. The composition of claim 11, said composition further comprising at least one ingredient selected from the group consisting of carbohydrates, proteins, and fats.

15. The composition of claim 11, said electrostatically charged ingredient bearing a negative charge.

16. A method of feeding an animal comprising the steps of:

providing an animal feed composition according to claim 1; and feeding said composition to an animal.

17. The method of claim 16, said composition comprising between about 0.01–64.0% by weight of said electrostatically charged ingredient.

18. The method of claim 16, said composition comprising a coating, wherein said coating comprises from about 0.001–50.0% by weight of said electrostatically charged ingredient based on the weight of the entire coated composition.

19. The method of claim 16, said composition further comprising at least one ingredient selected from the group consisting of carbohydrates, proteins, and fats.

20. The method of claim 16, said electrostatically charged ingredient bearing a negative charge.

21. A method of feeding an animal comprising the steps of:

providing an animal feed composition according to claim 6; and feeding said composition to an animal.

22. The method of claim 21, said composition comprising between about 0.01–64.0% by weight of said electrostatically charged ingredient.

23. The method of claim 21, said composition comprising a coating, wherein said coating comprises from about 0.001–50.0% by weight of said electrostatically charged ingredient based on the weight of the entire coated composition.

24. The method of claim 21, said composition further comprising at least one ingredient selected from the group consisting of carbohydrates, proteins, and fats.

25. The method of claim 21, said electrostatically charged ingredient bearing a negative charge.

26. A method of feeding an animal comprising the steps of:

providing an animal feed composition according to claim 11; and feeding said composition to an animal.

27. The method of claim 26, said composition comprising between about 0.01–64.0% by weight of said electrostatically charged ingredient.

28. The method of claim 26, said composition comprising a coating, wherein said coating comprises from about 0.001–50.0% by weight of said electrostatically charged ingredient based on the weight of the entire coated composition.

29. The method of claim 26, said composition further comprising at least one ingredient selected from the group consisting of carbohydrates, proteins, and fats.

30. The method of claim 26, said electrostatically charged ingredient bearing a negative charge.

31. A method of forming an animal feed composition comprising the steps of:

providing an ingredient selected from the group consisting of glycine, alanine, serine, glutamic acid, aspartic acid, lysine, proline and combinations thereof;

performing a pH adjustment step on the ingredient thereby causing the ingredient to assume an electrostatic charge that is greater than the charge exhibited by the ingredient in its natural state; and combining the ingredient with at least one additional component selected from the group consisting of carbohydrates, proteins, and fats.

32. The method of claim 31, said pH adjustment step comprising adjusting the pH of the ingredient to below about 5.

33. The method of claim 31, said pH adjustment step comprising adjusting the pH of the ingredient to above about 9.

* * * * *